(12) United States Patent
Meisner et al.

(10) Patent No.: US 8,215,885 B2
(45) Date of Patent: Jul. 10, 2012

(54) LOCKABLE FASTENER ASSEMBLY

(75) Inventors: Anthony Meisner, Bristol (GB); John Michael Anderton, Bristol (GB)

(73) Assignee: Airbus Operations Limited, Bristol (GB)

( * ) Notice: Subject to any disclaimer, the term of this patent is extended or adjusted under 35 U.S.C. 154(b) by 159 days.

(21) Appl. No.: 11/858,353

(22) Filed: Sep. 20, 2007

(65) Prior Publication Data

US 2008/0089758 A1 Apr. 17, 2008

(30) Foreign Application Priority Data

Oct. 16, 2006 (GB) .................................. 0620522.3

(51) Int. Cl.
  *F16B 39/24* (2006.01)
(52) U.S. Cl. ......... 411/132; 411/190; 411/197; 411/204
(58) Field of Classification Search .................. 411/123, 411/124, 127, 131, 132, 133, 172, 166, 190, 411/204, 257, 82, 92, 191, 197, 964
  See application file for complete search history.

(56) References Cited

U.S. PATENT DOCUMENTS

| | | | | |
|---|---|---|---|---|
| 86,582 | A * | 2/1869 | Palmer | 411/115 |
| 160,862 | A * | 3/1875 | Adgate | 411/101 |
| 177,594 | A * | 5/1876 | Walton | 411/130 |
| 732,411 | A * | 6/1903 | Hughes | 411/131 |
| 884,531 | A * | 4/1908 | Shrock | 411/330 |
| RE13,425 | E * | 6/1912 | Bloosom | 411/133 |
| 1,194,293 | A * | 8/1916 | Hughes | 411/190 |
| 1,349,491 | A * | 8/1920 | Burton | 411/136 |
| 1,477,509 | A * | 12/1923 | Lowry | 411/228 |
| 1,928,182 | A * | 9/1933 | Mahoney | 411/534 |
| 2,013,526 | A * | 9/1935 | Schmitt | 411/198 |
| 2,083,045 | A * | 6/1937 | Vaurs | 411/204 |
| 2,179,169 | A * | 11/1939 | Anderson | 411/130 |
| 2,234,557 | A * | 3/1941 | Hungerford | 411/112 |
| 2,461,097 | A * | 2/1949 | Wallace | 411/278 |
| 2,635,751 | A * | 4/1953 | Schroeder et al. | 209/319 |
| 2,691,199 | A * | 10/1954 | Schlueter | 411/551 |

(Continued)

FOREIGN PATENT DOCUMENTS

GB 4417 0/1909

(Continued)

OTHER PUBLICATIONS

GB Search Report dated Dec. 13, 2006 for GB0620522.3.

*Primary Examiner* — Victor Batson
*Assistant Examiner* — Roberta DeLisle
(74) *Attorney, Agent, or Firm* — Lowe, Hauptman, Ham & Berner, LLP

(57) ABSTRACT

A method of locking a fastener assembly against rotation relative to a laminar composite workpiece, the method comprising: passing a fastener through the workpiece; fitting a washer to the fastener; locking the washer against rotation relative to the workpiece; screwing a nut onto the fastener so as to clamp the washer against the workpiece; and locking the nut against rotation relative to the washer; a
a fastener assembly comprising: two or more fasteners; two or more nuts; a washer with two or more holes each sized to receive a respective one of the fasteners; and a locking mechanism adapted to prevent relative rotation between the nuts and the washer after the nuts have been screwed up to a desired torque.

17 Claims, 11 Drawing Sheets

U.S. PATENT DOCUMENTS

| | | | | |
|---|---|---|---|---|
| 2,765,017 | A * | 10/1956 | Robbins | 411/144 |
| 3,466,965 | A * | 9/1969 | McCarthy | 411/342 |
| 3,473,432 | A * | 10/1969 | Joy | 411/374 |
| 3,481,381 | A * | 12/1969 | Black | 411/162 |
| 3,674,585 | A * | 7/1972 | Windecker | 156/182 |
| 3,896,867 | A * | 7/1975 | Gill et al. | 411/353 |
| 4,055,208 | A | 10/1977 | Blaul | |
| 4,245,921 | A * | 1/1981 | Falcioni | 403/408.1 |
| 4,416,446 | A * | 11/1983 | Murakami | 267/140.3 |
| 4,948,316 | A * | 8/1990 | Duran et al. | 411/353 |
| 5,175,665 | A * | 12/1992 | Pegg | 361/218 |
| 5,380,323 | A * | 1/1995 | Howland | 606/278 |
| 5,544,902 | A * | 8/1996 | Belter | 277/630 |
| 6,171,009 | B1 * | 1/2001 | Wright | 403/30 |
| 6,193,237 | B1 * | 2/2001 | Schweiger et al. | 277/598 |
| 2003/0021628 | A1 * | 1/2003 | Gudaitis et al. | 403/408.1 |
| 2003/0152432 | A1 * | 8/2003 | Meece et al. | 409/132 |

FOREIGN PATENT DOCUMENTS

| | | | |
|---|---|---|---|
| GB | 344923 | | 3/1931 |
| GB | 2138912 | A | 10/1984 |
| GB | 2212580 | A * | 7/1989 |
| WO | 2006114560 | A1 | 11/2006 |

* cited by examiner

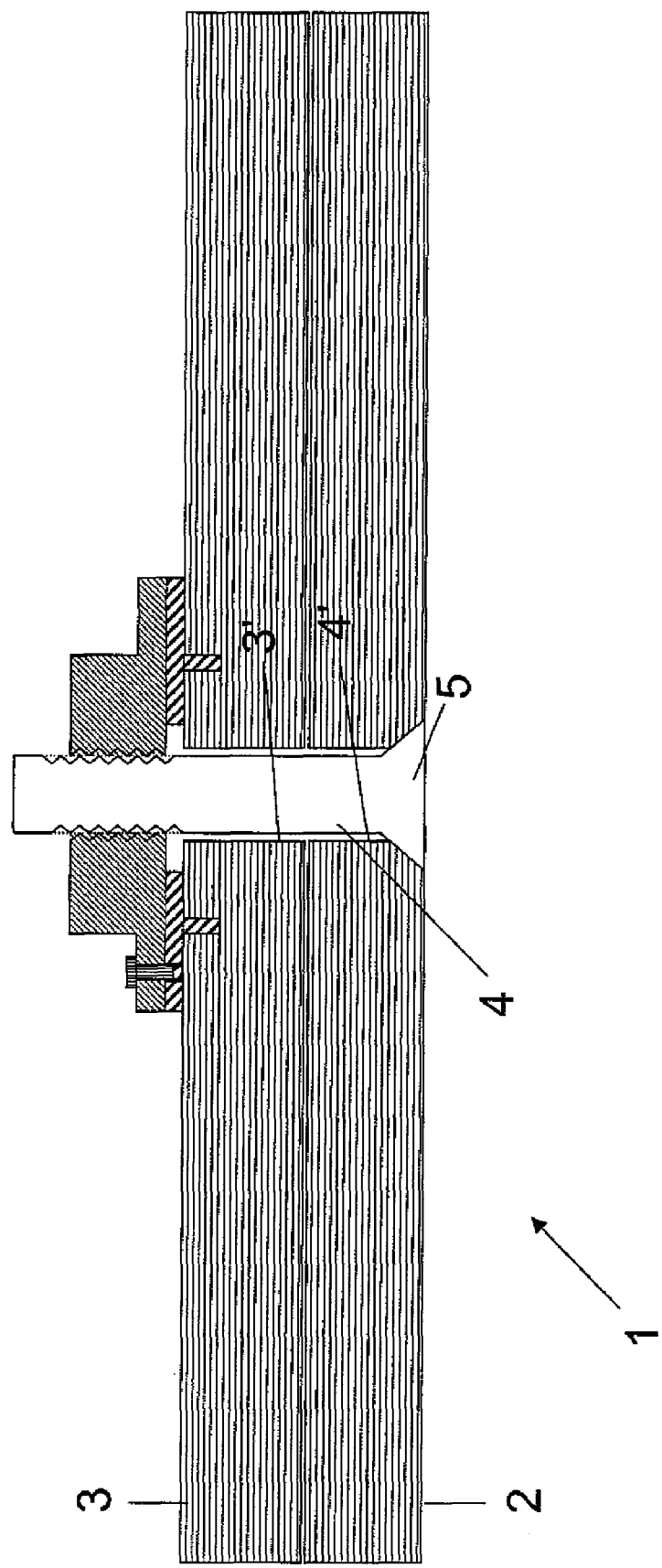

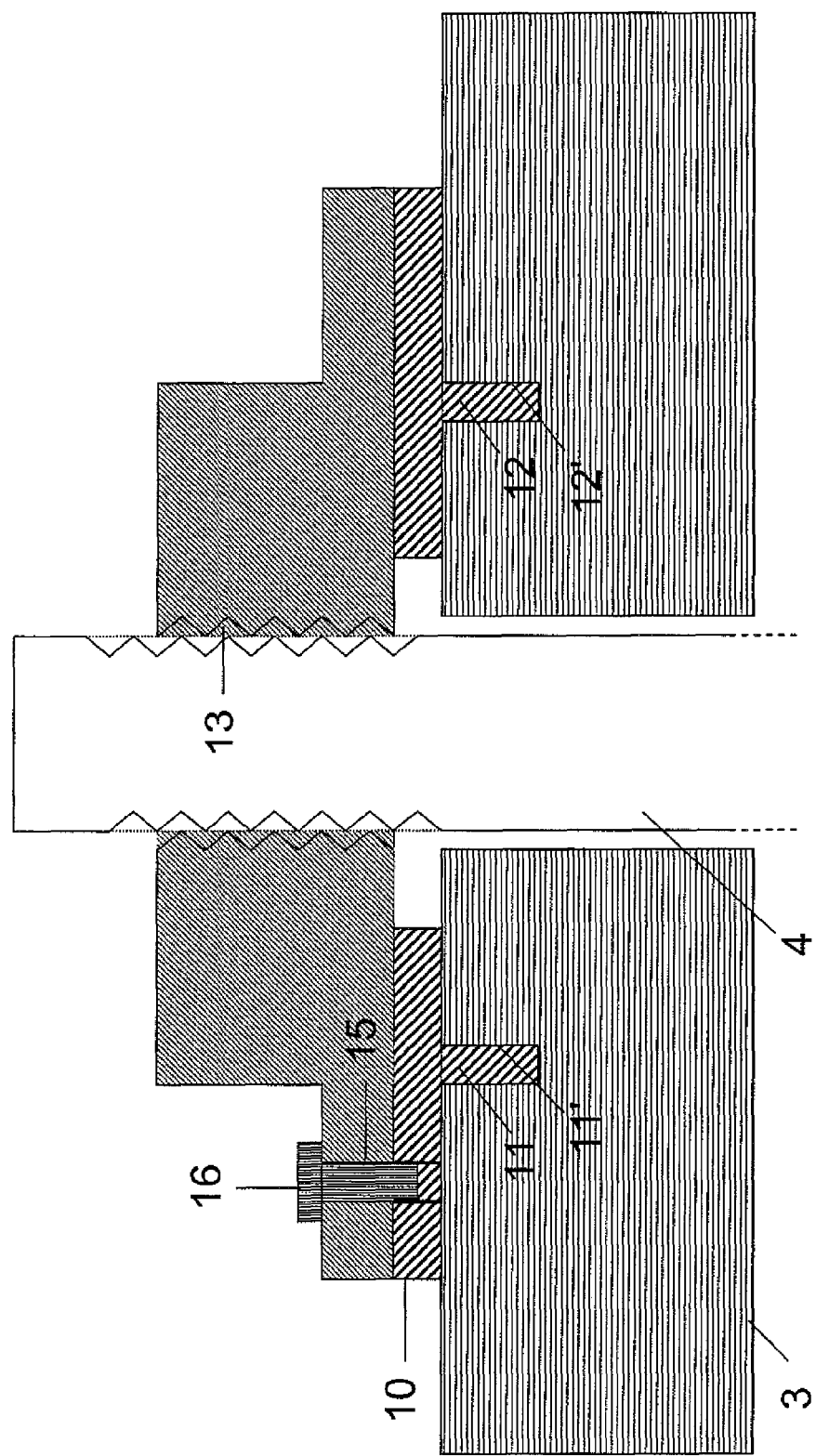

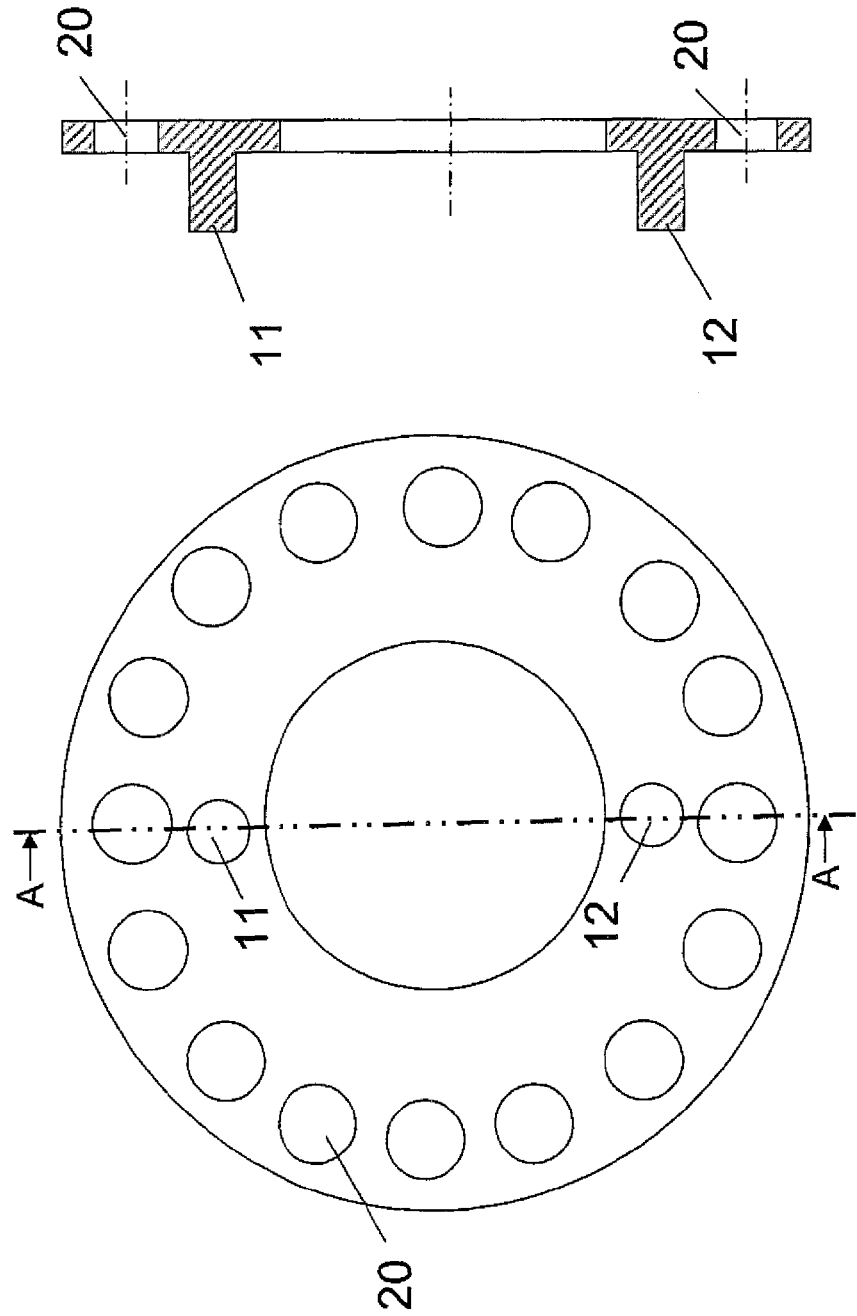

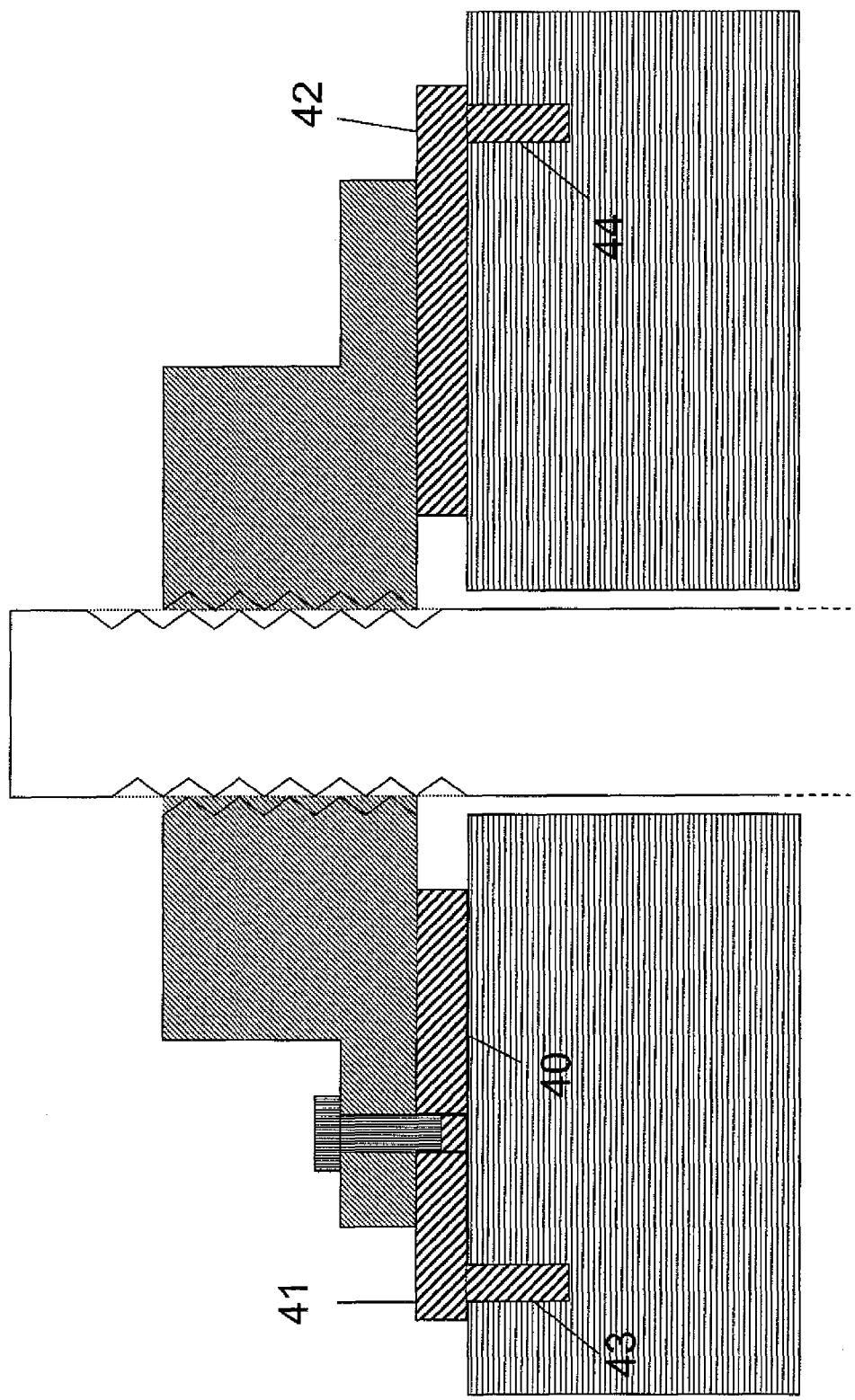

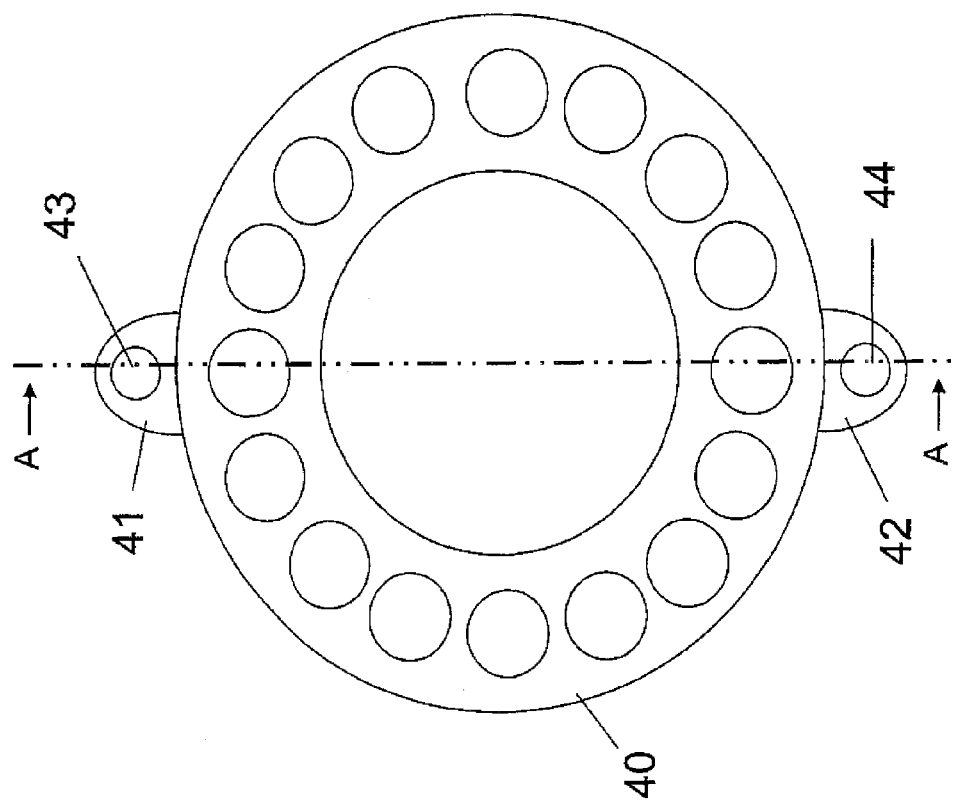

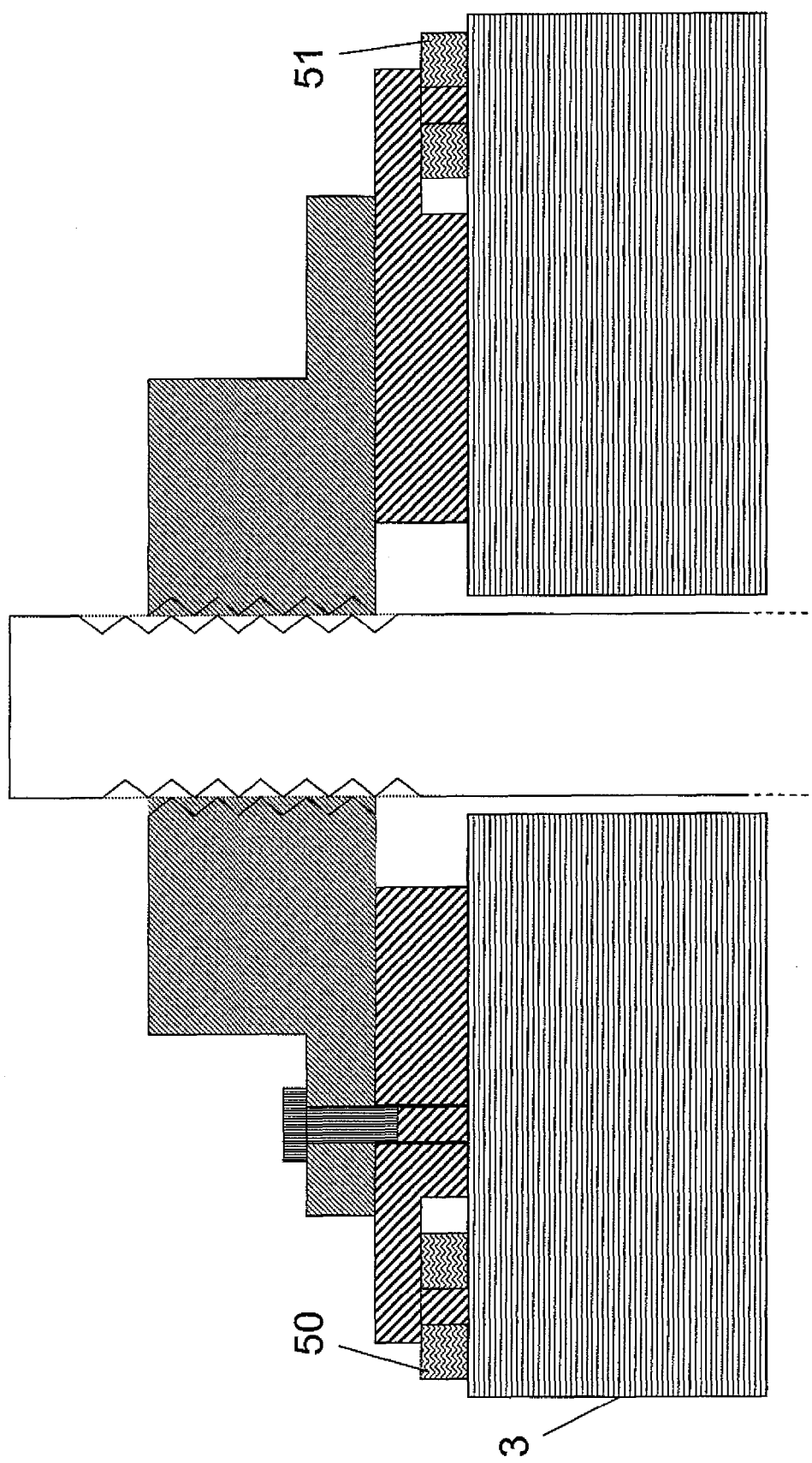

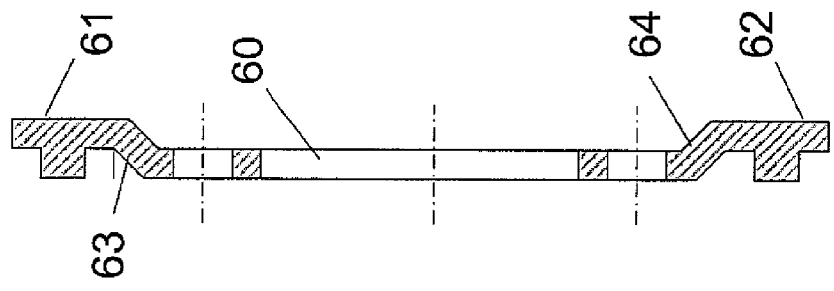
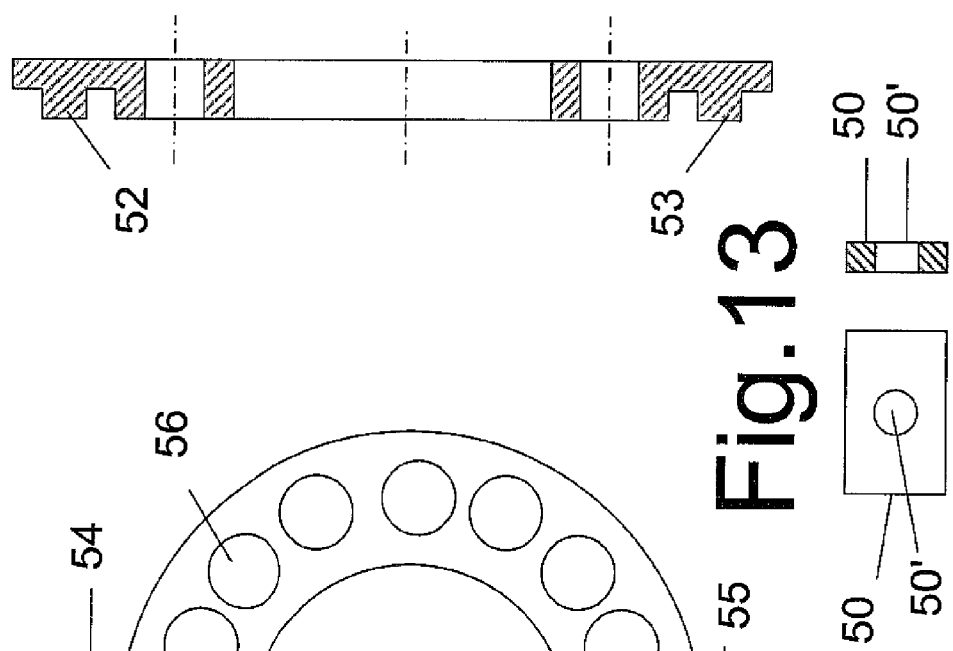
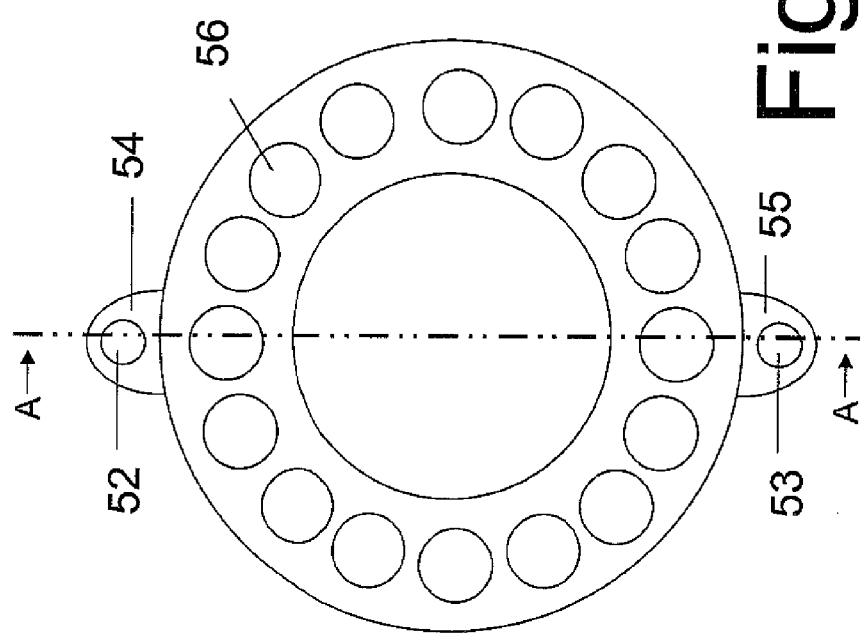

LOCKABLE FASTENER ASSEMBLY

RELATED APPLICATIONS

The present application is based on, and claims priority from, British Application Number 0620522.3, filed Oct. 16, 2006, the disclosure of which is hereby incorporated by reference herein in its entirety.

FIELD OF THE INVENTION

The present invention relates to a fastener assembly, a method of locking a fastener assembly against rotation relative to a laminar composite workpiece, and a joint formed by such a method. The fastener assembly is useful primarily, but not exclusively, in aerospace applications.

BACKGROUND OF THE INVENTION

Primary aerospace structures are assembled using high strength fasteners. In metallic structures these fasteners are assembled in interference fit holes (i.e. the fastener diameter is marginally larger than the hole diameter). However, due to the nature of composite materials it is currently inappropriate to use interference fit fasteners in composite laminate structures. Therefore, in composite material structures it is necessary to use clearance fit fasteners (i.e. the fastener diameter is smaller than the hole diameter). The extreme vibrations and high load cycles seen during an aircraft's life can cause clearance fit fasteners to spin or rotate in their hole. Although this does not necessarily affect the clamping force of the fastener, excessive rotation may have several other detrimental effects: fastener rotation may damage the surface of the structure under the fastener head and/or tail; and rotation can break the sealant applied around a fastener resulting in a potential fuel leak.

SUMMARY OF THE INVENTION

A first aspect of the invention provides a method of locking a fastener assembly against rotation relative to a laminar composite workpiece, the method comprising: passing a fastener through the workpiece; fitting a washer to the fastener; locking the washer against rotation relative to the workpiece; screwing a nut onto the fastener so as to clamp the washer against the workpiece; and locking the nut against rotation relative to the washer.

The method of the invention prevents the fastener from rotating under the influence of the loads and/or vibration it experiences during service.

Typically the washer is locked by inserting a washer locking member (such as a pin) into a hole in the workpiece. It is believed that if the hole in the workpiece is sufficiently shallow, and is located in an optimal position relative to the hole in the workpiece which receives the fastener, it will not severely degrade the structural performance of the workpiece. Optionally, if there is a concern that the structural performance of the workpiece may be degraded, then a strip may be bonded to a body portion of the workpiece, and the locking member extends from the washer into the strip but not into the body portion. Alternatively a strip may be bonded to a body portion of the workpiece, and the strip has a locking member which extends into the washer.

Typically the nut is locked by inserting a nut locking member (such as a pin) into the washer. The nut locking member may be mounted on a spring in a closed hole in the nut which biases the nut locking member into an extended position in which it fits into the hole in the washer. Alternatively the nut locking member may have a shaft which passes though a hole in the nut, and a head which engages the nut.

A second aspect of the invention provides a joint comprising: a composite laminar workpiece; a fastener passing through the workpiece; a washer which is fitted to the fastener and locked against rotation relative to the workpiece; and a nut which clamps the washer against the workpiece and is locked against rotation relative to the washer.

Typically the washer is locked by a washer locking member which is formed integrally with the washer. The washer locking member may extend from an annular body of the washer, or from a lug extending from a side of the annular body portion. In one embodiment the lug is joined to the annular body portion by an arm which extends from a side of the annular body portion at an angle to the axis of the annular body portion.

The workpiece may comprise part of an aircraft such as a rib or spar, or may be a composite workpiece in a variety of other applications.

The laminar composite workpiece may be formed from a variety of materials, including fibre-reinforced materials such as carbon-fibre reinforced polymer (CFRP), or glass-fibre reinforced polymer. Each layer of the workpiece may be formed from composite material, or the workpiece may be formed from a fibre metal laminate (FML) comprising metal layers bonded with layers of composite material. An example of an FML is glass-reinforced fibre metal laminate (GLARE).

A third aspect of the invention provides a fastener assembly comprising: two or more fasteners; two or more nuts; a washer with two or more holes each sized to receive a respective one of the fasteners; and a locking mechanism adapted to prevent relative rotation between the nuts and the washer after the nuts have been screwed up to a desired torque.

Typically the locking mechanism comprises two or more nut locking members (such as pins), each of which is received in a hole in a respective nut and a hole in a respective part of the washer. Typically each nut locking member comprises a shaft which is received in the holes in the nut and the washer, and a head which engages the nut.

BRIEF DESCRIPTION OF THE DRAWINGS

Embodiments of the invention will now be described with reference to the accompanying drawings, in which:

FIG. 1 is a sectional view of a joint between a pair of laminar composite workpieces;

FIG. 2 shows the fastener assembly in detail;

FIG. 3 is a plan view of the washer;

FIG. 4 is a sectional view of the washer;

FIG. 7 is a sectional view of a first alternative fastener assembly;

FIG. 8 is a plan view of the washer used in the fastener assembly of FIG. 7;

FIG. 9 is a sectional view of the washer used in the fastener assembly of FIG. 7;

FIG. 10 is a sectional view of a second alternative fastener assembly;

FIG. 11 is a plan view of the washer used in the fastener assembly of FIG. 10;

FIG. 12 is a sectional view of the washer used in the fastener assembly of FIG. 10;

FIG. 13 shows the strip in plan and section;

FIG. 14 is a sectional view of an alternative washer for use in the fastener assembly of FIG. 10;

DETAILED DESCRIPTION OF EMBODIMENT(S)

Figure 6:
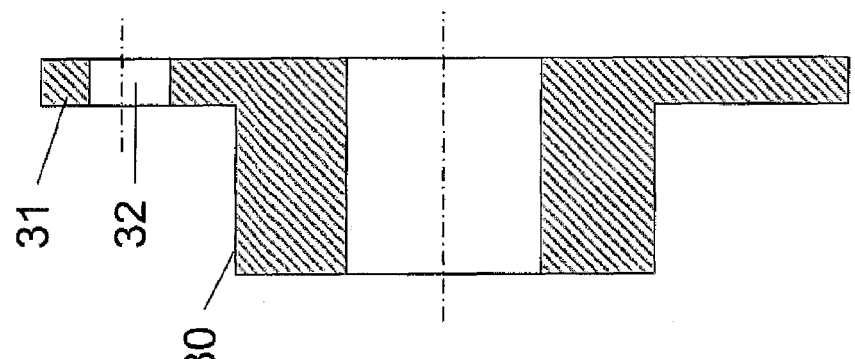
FIG. 6 is a sectional view of the nut.

A joint 1 shown in FIG. 1 comprises a pair of laminar composite workpieces 1,2 clamped together by a fastener assembly which is shown in detail in FIGS. 2-6. The workpiece 2 may be, for example, a wing skin and the workpiece 3 may be, for example, a spar of the wing. The fastener assembly comprises a bolt with a cylindrical shaft 4 which is passed through aligned cylindrical holes 2',3' in the workpieces, and a head 5 which is received in a recess so as to lie flush with the outer (aerodynamic) surface of the skin 2. The shaft 4 passes through the holes as a clearance fit (i.e. the shaft diameter is smaller than the hole diameters).

Each workpiece 2,3 comprises a series of plies of a composite material such as carbon-fibre reinforced epoxy resin. Each workpiece is formed by forming a stack of so-called "prepregs", and co-curing the prepregs in an autoclave. Each prepreg comprises a layer of unidirectional carbon fibres impregnated with a thermosetting epoxy resin matrix, with adjacent prepregs in the stack having their fibres running at different angles. The outer ply of each workpiece is formed by a single ply of glass fibre reinforced epoxy resin.

Referring to FIG. 2, a washer 10 is fitted to the shaft 4 and is integrally formed with a pair of washer locking pins 11,12 extending axially from the washer. The pins 11,12 are inserted into drilled holes 11',12' in the workpiece 3 so as to lock the washer against rotation relative to the workpiece. The holes 11',12' are appropriately sited so that when the washer is in place, the washer's large central hole is lined up with the fastener holes 2',3' in the workpieces 2,3. The drilling process is carefully controlled to prevent cracking or delamination of the workpiece.

It is believed that if the holes 11',12' in the workpiece are sufficiently shallow, they will not severely degrade the structural performance of the workpiece 3 despite its laminar structure. The holes 11',12' are sufficiently spaced from the edge of the hole 3' so as not to severely degrade the properties of the structure around the hole 3'. Also, the holes 11',12' can be located relative to the hole 3' so that they lie in an area of relatively low stress concentration. For example, if the main load direction of the workpiece is along line A-A in FIG. 3, then the holes 11',12' may lie in such an area of relatively low stress concentration. The optimal location for the holes 11',12' may also be influenced by the fibre direction in the composite plies close to the surface of the workpiece 3.

Figure 5:
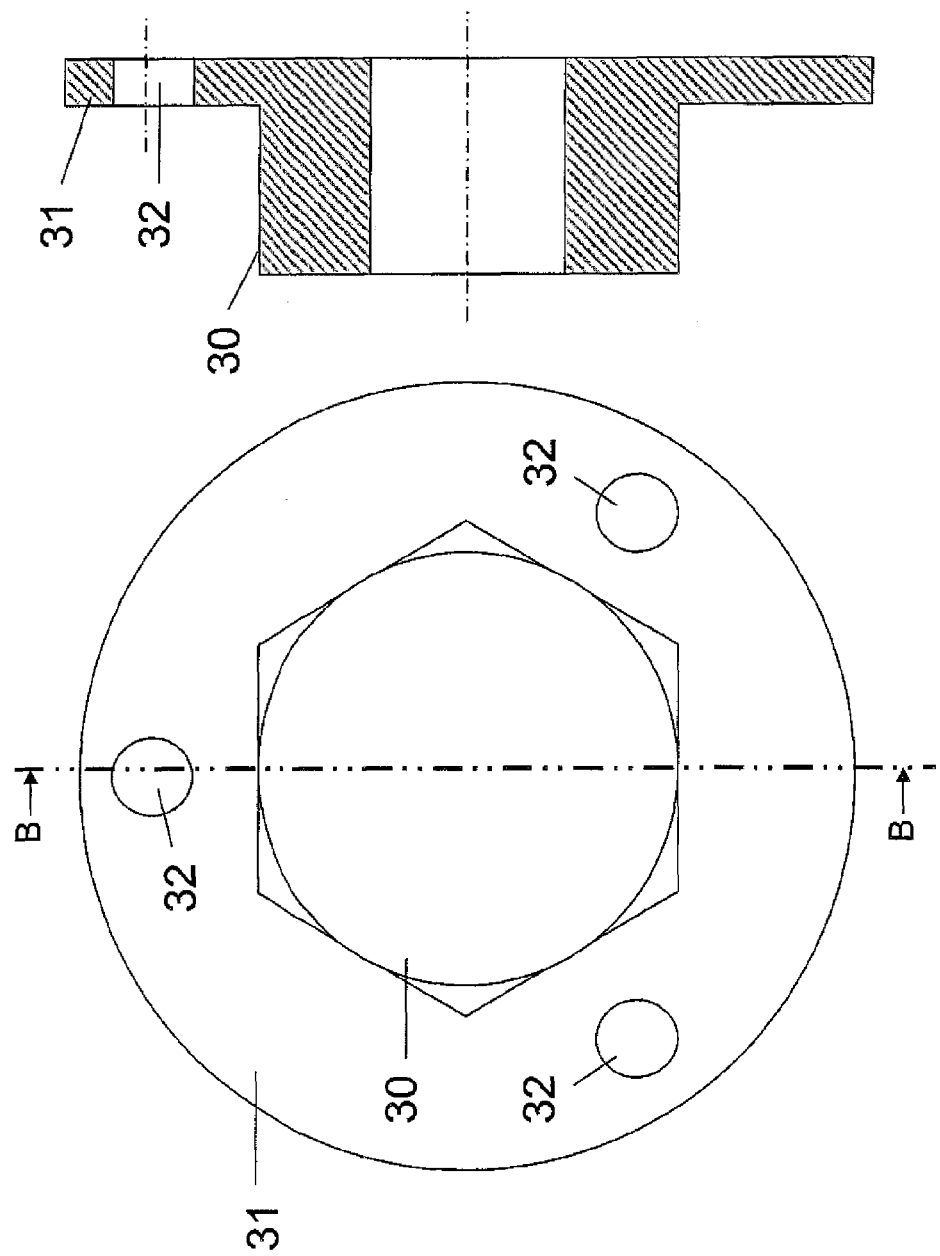
FIG. 5 is a plan view of the nut.

A nut with an internally threaded bore 13 is screwed onto the threaded end of the shaft 4 so as to clamp the washer 10 against the workpiece 3. The washer 10 has a concentric ring of evenly spaced holes 20 shown most clearly in FIG. 3. Referring to FIG. 5, the nut has a hexagonal head 30, and a flange 31 with three circular holes 32. After the nut has been screwed up to a desired torque, the nut is locked against rotation relative to the washer by three nut locking pins (one of which is shown in FIG. 2). Each pin has a shaft 15 which can be passed through one of the holes 32 in the nut and one of the holes 20 in the washer when they line up. Each pin has a head 16 which bears against the flange 31 of the nut.

The nut locking pins may be retained in the flange 31 by a variety of methods. For instance the shaft 15 may be screwed in: that is, the shaft 15 is externally threaded, and the hole 20 in the washer (and/or the hole 32 in the nut) internally threaded. Alternatively the shaft 15 may be received as an interference fit in the hole 20 and/or the hole 32.

After assembly, the nut, washer, and end of the fastener shaft are encapsulated in a sealant to ensure a fluid-tight joint, thus preventing the leakage of fuel through the joint.

A variant washer is shown in FIGS. 7-9. In this case, the pins 11,12 which extend from the annular body of the washer 10 of FIGS. 1-6 are replaced by pins 42,43 which extend axially from lugs 41,42. As can be seen in FIG. 8, the lugs 41,42 extend radially from opposite sides of the annular body portion 40 of the washer.

The washer shown in FIG. 8 has several advantages in comparison with the washer shown in FIG. 3. First, the annular body portion 40 is less thick, resulting in a weight reduction. Second, the washer has a smaller dimension, at least in the X-direction (orthogonal to the Y-direction defined by line A-A in FIG. 8). Third, the 42,43 have a greater distance from the centre of the washer than the pins 11,12, and thus have a greater moment to lock the washer against rotation. Fourth, the greater distance of the pins 42,43 from the centre of the washer means that the holes in the workpiece can be spaced further from the large hole which receives the shaft of the fastener.

A further variant joint is shown in FIGS. 10-12. In this case separate strips 50,51 are bonded to the body of the workpiece 3 by adhesive (not shown). Each strip 50,51 is formed with a hole for receiving a pin 52,53 extending axially from a lug 54,55 of a washer 56 shown in FIGS. 11 and 12. As shown in FIG. 10, the washer pins 52,53 extend into the strips 50,51 but not into the body portion of the workpiece 3. FIG. 13 shows one of the strips 50 (and its hole 50') in plan and section. Instead of a through-hole, the strips may be formed with a closed hole (or recess) which extends only part of the way through the strip, and receives the end of the washer locking pin.

Note that the locking strip 50, 51 are spaced from the edge of the hole in the workpiece 3. This enables the corner of the hole to be inspected easily for cracks.

The variant of FIGS. 10-12 is suitable for structural applications in which pin holes in the body portion of the workpiece 3 are not appropriate, for example due to a limited stress concentration allowance.

In a further variant (not shown), the bonded strips may be integrally formed with pins which fit into axially extending holes or recesses in the washer to lock the washer in place.

Figure 11A:
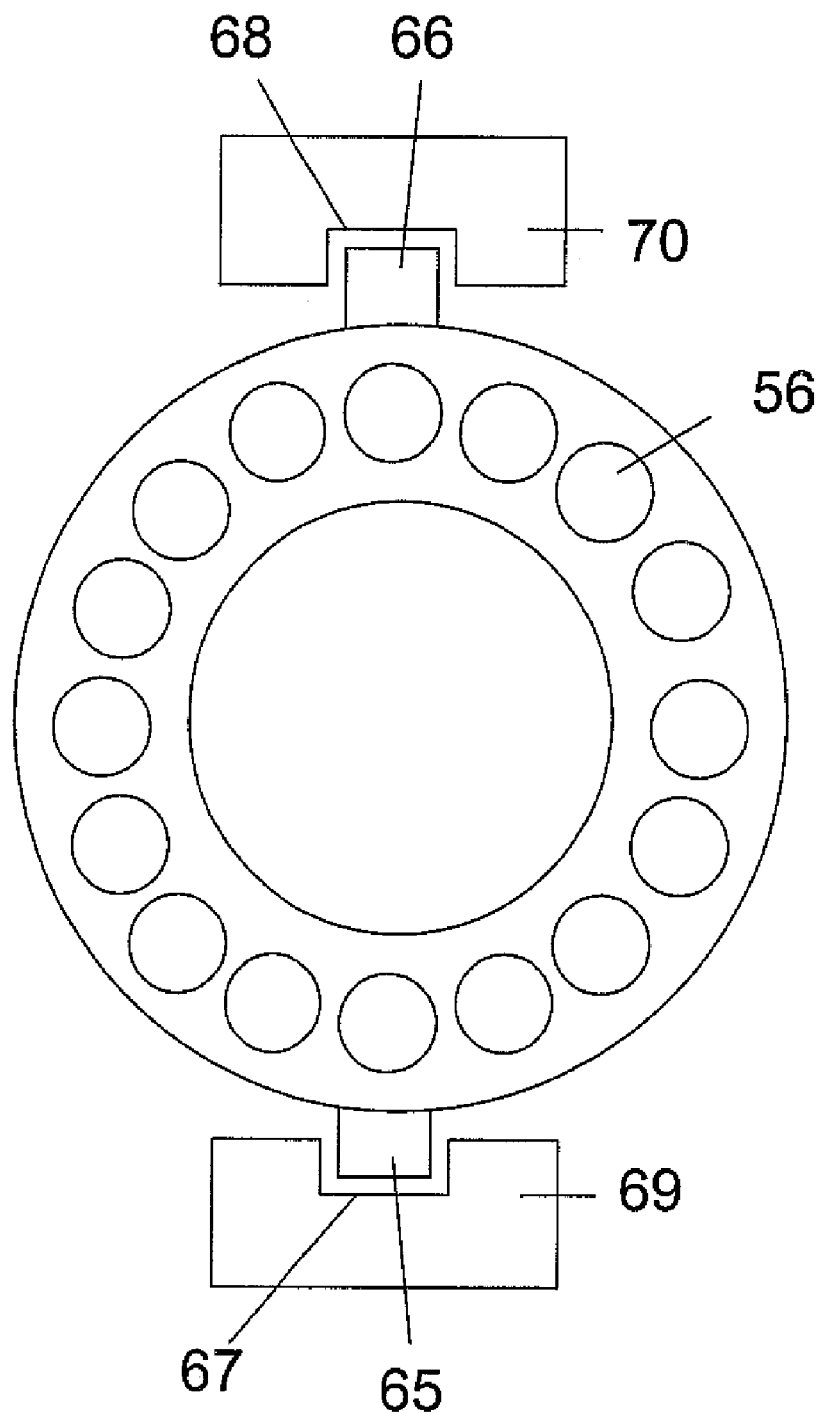
FIG. 11a is a variation of the washer depicted in FIG. 11.

In a further variant shown in FIG. 11a the lugs and pins shown in FIG. 11 are replaced by axially extending locking members 65,66 which fit into recesses 67,68 in bonded strips 69,70.

A further variant washer 60 for use with the strips 50,51 is shown in FIG. 14. In this case the annular body of the washer 60 is thinner than the annular body of the washer 56, and the lugs 61,62 are joined to the body 60 by arms 63,64 which extend radially and upwardly at an angle from the body.

Figure 16:
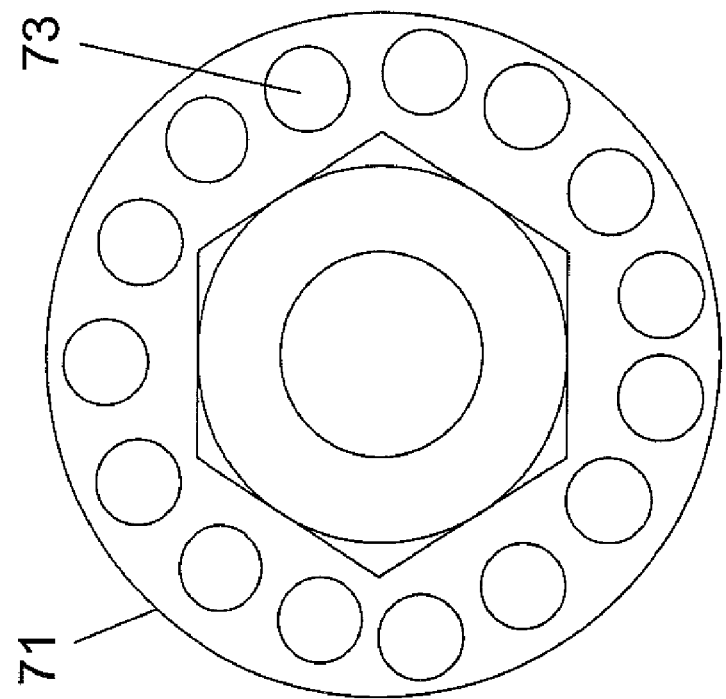
FIG. 16 is a plan view of a nut for use with the washer of FIG. 15.
Figure 15:
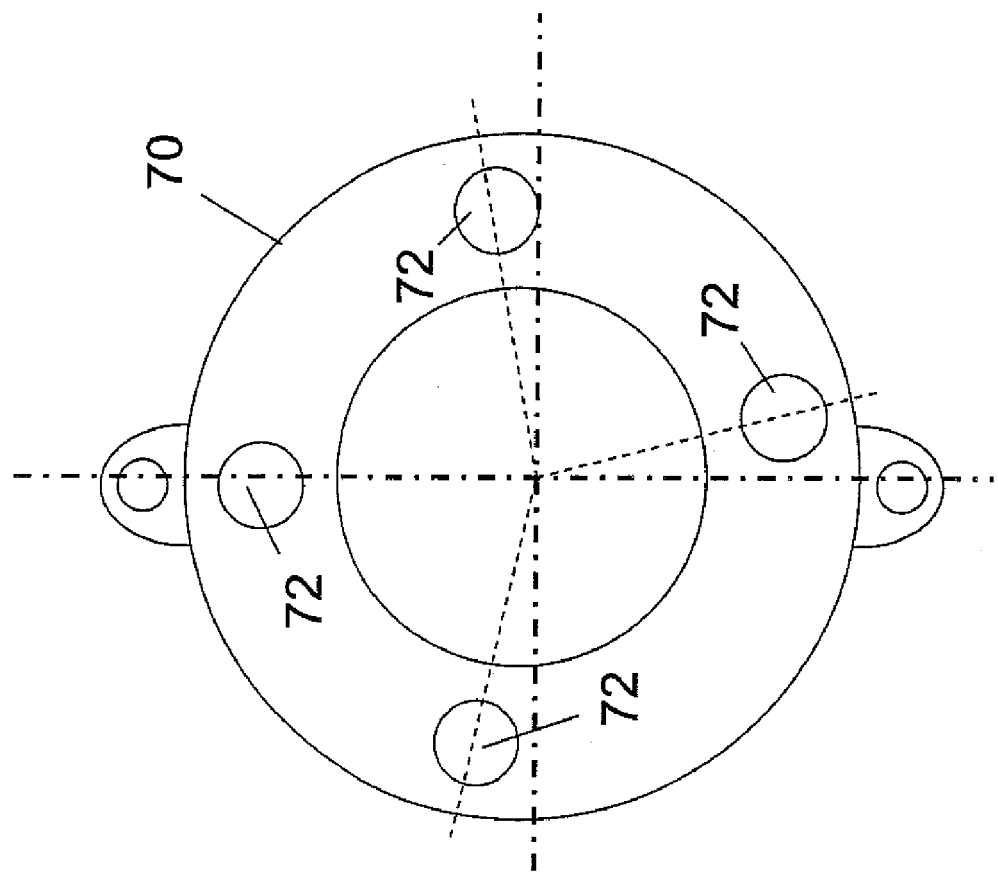
FIG. 15 is a plan view of an alternative washer for use in the fastener assembly of FIG. 7 or FIG. 10.

A further variant washer 70 is shown in FIG. 15, and a nut 71 for use with the washer 70 is shown in FIG. 16. The washer 70 has four holes 72 which are irregularly spaced around the washer. The nut 71 has a ring of regularly spaced holes. When one of the holes 72 lines up with one of the holes 73, a nut locking pin can be inserted. This enables the nut locking pin to be inserted without having to adjust the nut significantly from a desired torque.

In a further variant (not shown), the holes in the nut may be irregularly spaced instead of the holes in the washer.

Figure 17:
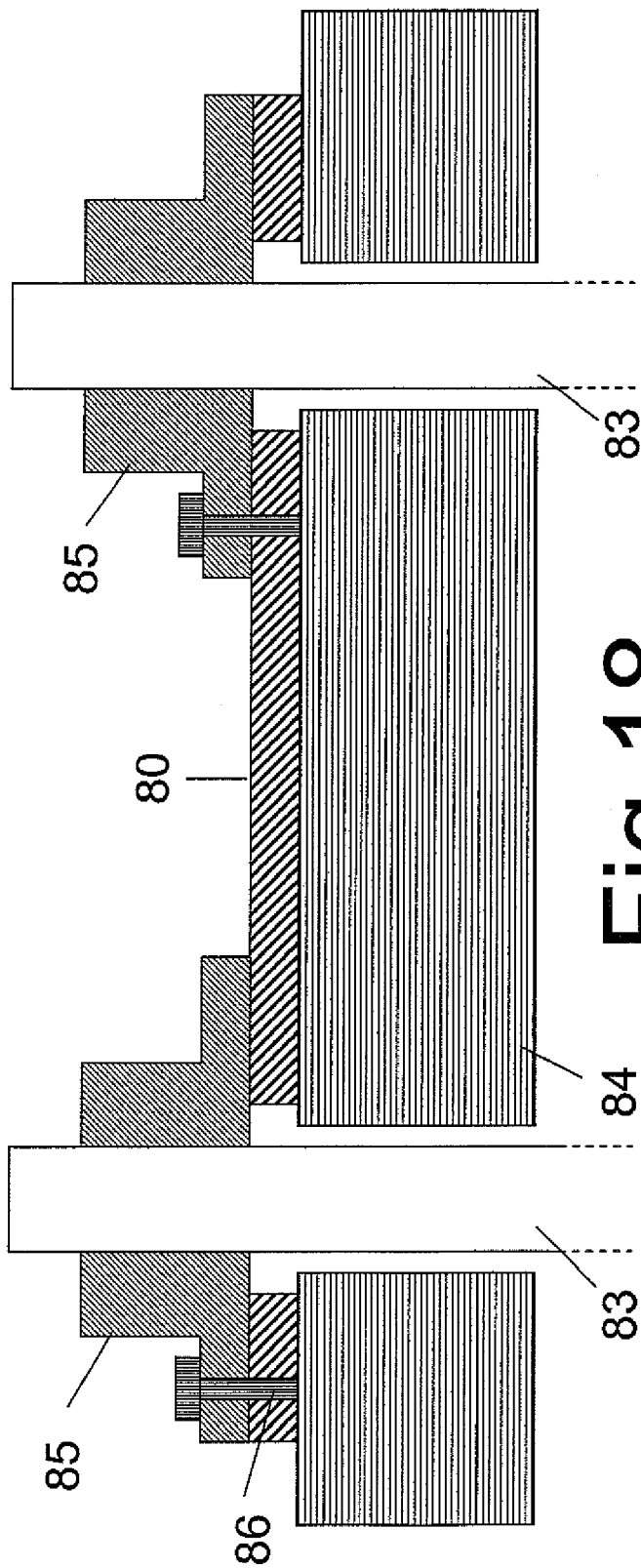
FIG. 17 is a sectional view of a third alternative fastener assembly.
Figure 18:
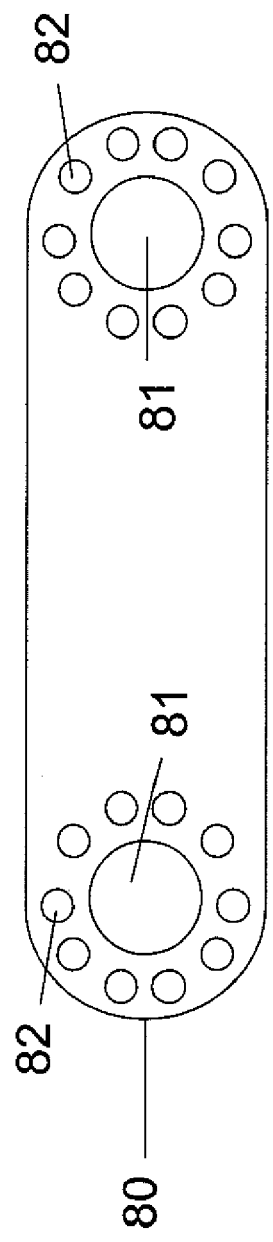
FIG. 18 is a plan view of the washer used in the fastener assembly of FIG. 17.

A further variant fastener assembly is shown in FIGS. 17 and 18. A elongated double washer 80 has a pair of large holes 81 at either end, each surrounded by a regularly spaced concentric ring of holes 82. Each hole 81 receives a respective fastener 83 passing through a respective hole in the workpiece 84. The washer 80 is clamped to the workpiece 84 by a pair of nuts 85 which are identical in construction to the nut shown in FIG. 2. Each nut is locked against rotation relative to the washer 80 by three pins (one of which is shown for each nut in FIG. 15). The pins have shafts 86 which can be passed through the holes in the nut and the holes 82 in the washer when they line up and the nut has been screwed up to a desired torque. Note that in contrast to the arrangement of FIG. 1, the washer 80 does not have locking pins which extend into the workpiece 84.

Although the invention has been described above with reference to one or more preferred embodiments, it will be appreciated that various changes or modifications may be made without departing from the scope of the invention as defined in the appended claims.

The invention claimed is:

1. A joint comprising:
   a pair of workpieces at least one of which is a composite laminar workpiece, each said workpiece having a through-hole, the composite laminar workpiece further having a drilled washer locking hole of a diameter smaller than that of the through-hole of the composite laminar workpiece;
   a fastener passing through the workpieces;
   a washer having at least one locking hole, said washer is fitted to the fastener and has a washer locking member extending from the washer into the washer locking hole of the composite laminar workpiece so as to lock the washer against rotation relative to the composite laminar workpiece; and
   a nut having at least one locking hole, said nut engages with the fastener to fasten the workpieces together, clamps the washer against the composite laminar workpiece,
   a locking pin, comprising:
      a shaft which is received in the aligned said at least one washer locking hole and said at least one nut locking hole, without extending into said composite laminar workpiece, for locking the nut against rotation relative to the washer; and,
      a head which engages an upper side of said nut, whereas an underside of said nut presses the washer toward the workpieces;
   wherein the workpieces are parts of an aircraft; and
   wherein the composite laminar workpiece is made from a material selected from the group consisting of carbon-fiber reinforced polymer (CFRP), glass-fiber reinforced polymer, and fiber metal laminate (FML).

2. The joint of claim 1 wherein the washer locking member is formed integrally with the washer.

3. The joint of claim 1 wherein the washer comprises:
   an annular body portion, and
   a lug extending in a radial direction of the annular body portion from a side of the annular body portion, and
   wherein the washer locking member extends in an axial direction of the annular body portion from the lug.

4. The joint of claim 1 wherein
   said nut comprises:
      a first fastener receiving hole which receives and engages the fastener; and
      said first locking hole extending through an entire thickness of the nut from said upperside of said nut to said underside of said nut; and
   said washer comprises
      a second fastener receiving hole fit over the fastener; and
      said second locking hole aligned with the first locking hole of the nut.

5. The joint of claim 1, wherein the fastener is a clearance fit fastener.

6. The joint of claim 4, wherein
   the washer comprises a ring of said second locking holes, said ring being concentric with the second fastener receiving hole of the washer; and
   the nut is locked against rotation relative to the washer by the locking pin extending through the first locking hole of the nut and one of the second locking holes of the washer.

7. The joint of claim 1, wherein the washer locking hole in the composite laminar workpiece is a blind hole.

8. The joint of claim 1, wherein the locking pin is removably received in the locking hole.

9. The joint of claim 8, wherein the locking pin is completely removable from the locking hole.

10. The joint of claim 1, wherein the locking pin has an external thread and the locking hole has an internal thread engaged with the external thread of the locking pin.

11. The joint of claim 1, wherein the locking pin has an outer diameter smaller than an inner diameter of the locking hole, and is interference-fit into the locking hole.

12. The joint of claim 1, wherein the locking pin locks the nut against loosening rotation relative to the washer up to a torque that is destructive to said locking pin.

13. The joint of claim 4, wherein the shaft is removably received in the first locking hole of said nut.

14. The joint of claim 13, wherein the shaft is completely removable from the first locking hole of said nut.

15. The joint of claim 4, wherein the shaft has an external thread and at least one of the first or second locking hole has an internal thread engaged with the external thread of the shaft.

16. The joint of claim 4, wherein the shaft has an outer diameter smaller than an inner diameter of at least one of the first or second locking hole, and is interference-fit into said at least one of the first or second locking hole.

17. The joint of claim 4, wherein the nut locking member locks the nut against loosening rotation relative to the washer up to a torque that is destructive to said nut locking member.

* * * * *